United States Patent Office 3,182,033
Patented May 4, 1965

3,182,033
CROSSLINKED POLYETHYLENE WAX
COMPOSITION
Razmic S. Gregorian, Silver Spring, Md., assignor to W. R.
   Grace & Co., a corporation of Connecticut
No Drawing. Filed June 14, 1962, Ser. No. 202,398
4 Claims. (Cl. 260—28.5)

This application is a continuation in part of copending application Serial No. 848,203, filed October 23, 1959, now abandoned.

This invention relates to a novel crosslinked composition and a process for preparing same. More particularly this invention pertains to novel crosslinked thermoplastic polymer-wax compositions of improved clarity.

Polyethylene as it is generally known today is divided into two classes, i.e., low density polyethylene made under extremely high pressures using a peroxide catalyst, see U.S. 2,153,553, and high density polyethylene produced by a low pressure process; see for example U.S. 2,825,721.

Low density polyethylene, due to its being highly branched, exhibits remarkable clarity and transparency when processed into film form. High density polyethylene on the other hand is substantially linear and in film form is translucent. To overcome this drawback high density polyethylene is often subjected to crosslinking which renders film of the polymer transparent. Several means of accomplishing this transformation are employed with varying success. Such means include electron impingement of the polymer and blending of free radical-forming substances with the polymer. However while crosslinking improves the clarity and transparency of high density polyethylene it also renders the polymers unprocessable due to transforming it from a thermoplastic material to a thermoset material having a measurable gel content. Thus the problem of obtaining a high density crosslinked transparent polyethylene composition which is processable after crosslinking has occurred is one desirous of a solution.

It is an object of the instant invention to provide a crosslinked thermoplastic composition of high density polyethylene which has superior clarity to the parent polymer per se.

Another object of the present invention is to provide a crosslinked thermoplastic composition of high density polyethylene which has greater resistance to environmental stress cracking than the parent polymer per se.

A still further object of this invention is to provide a crosslinked thermoplastic composition of high density polyethylene which after incorporating the two aforementioned objects has a sufficiently high melt index to be processable by methods well known in the ethylene polymer art, e.g., extrusion, molding and the like.

It is known in the art to add minor amounts of polyethylene to a major portion of wax to increase the melting point of the wax. See U.S. 2,882,246, issued to Leatherman et al. Such compositions, however, are merely mechanical mixtures void of any chemical bonding between the constituents. The prior art also teaches blending of wax in minor amounts with polymers to obtain highly flexible coatings. See U.S. 2,298,846.

Blending of the low density polyethylene and di(aralkyl) peroxides on hot rolls at temperatures in the range 100 to 125° C. followed by a molding operation at 150° C. whereat the peroxide decomposes causing cross-linking of the polyethylene is disclosed in U.S. 2,826,570. This operation is not applicable to high density polyethylene (i.e., density 0.950–0.970) since at the fluxing temperature of high density polyethylene the peroxide decomposes at a rate sufficiently fast to crosslink the polymer. The high density crosslinked polyethylene resulting from such an operation is not processable due to its high viscosity shown as the inverse function of the melt index. The inability to process high density polyethylene after crosslinking has seriously impaired its commercial acceptability.

Surprisingly it has now been found that a processable thermoplastic crosslinked high density polyethylene composition is obtained by admixing with molten high density polyethylene, a preblended material consisting of an organic peroxide which produces free radicals in a range 80–200° C. and a paraffin wax said wax being present in an amount between 1–20% by weight of said composition and said peroxide being present in an amount between 0.05–1.0% by weight of said composition.

In practicing this invention it is critical that the wax and peroxide be preblended together before being added to the molten polyethylene. If the wax is added prior to the peroxide, an insufficient amount of the wax is crosslinked with the polyethylene to obtain a processable composition. This drawback can be eliminated by increasing the weight percent of the wax in the composition to an amount greater than 20% by weight. However the presence of wax in amounts in excess of 20% by weight has a detrimental effect on the physical properties of the crosslinked composition; for example the resistance to environmental stress cracking decreases sharply when the wax content exceeds this figure. If the peroxide is added to the molten polyethylene prior to the wax, the wax takes no part in the crosslinking and the resulting composition is merely crosslinked polyethylene blended with wax. Such a composition has poor processability and resistance to environmental stress cracking. Thus to insure that a processable crosslinked polyethylene-wax composition, which exhibits improved clarity and improved resistance to environmental stress cracking, is obtained it is critical that the wax and peroxide be preblended prior to addition to the molten polyethylene.

It is also critical in performing the instant invention that upon the addition of the preblended wax and peroxide, the temperature of the molten polyethylene is sufficient for the peroxide to have a half-life of 1 minute or less thereat.

Since the free radicals generated by decomposition of the peroxide react the same with the methylene groups in the wax as with the methylene groups in the polyethylene the frequency of the free radicals reacting with wax or polyethylene depends on proximity thereto. By preblending the wax and peroxide and thereafter adding the preblend to the molten polyethylene at a temperature whereat the half-life of the peroxide is 1 minute or less, the free radicals are generated while the localized concentration of the wax is high. Thus the frequency with which the free radicals react with the wax is higher than the frequency of reaction with the polyethylene. This procedure insures that the free radicals generated on decomposition of the peroxide react with greater frequency with the component present in the composition in a minor amount, i.e., 1–20 weight percent wax, than with the major component present, i.e., 80–99 weight percent polyethylene, to yield a crosslinked thermoplastic processable wax-polyethylene product of superior clarity to polyethylene per se.

Both aforestated critical steps are necessary to operability of this invention and neither one alone is sufficient. For example if one preblends the wax and peroxide and thereafter adds the preblend to molten polyethylene at a temperature insufficient to give the peroxide a half-life of 1 minute or less, then before sufficient decomposition of the peroxide occurs the wax becomes delocalized as regards to the peroxide and this cancels out the beneficial effect of preblending. Thus it is not only critical to preblend the wax and peroxide but also critical to add the preblend to the molten polyethylene at a temperature sufficient to give the peroxide a half-life of 1 minute or less. For dicumyl peroxide a temperature of 170° C. and higher is necessary to obtain a half-life of 1 minute or less.

The preblending of wax and peroxide is performed at temperatures above the softening point of the wax but below the decomposition temperature of the peroxide to obtain uniformity of admixture while at the same time making certain that the peroxide does not decompose and crosslink the wax prior to addition to the molten polyethylene.

The polyethylene referred to throughout this invention relates solely to "high density polyethylene," i.e., having a density in the range 0.950 to 0.970 as measured under the conditions specified in ASTMD 1505–57T. A polyethylene having a density in the aforesaid range will ordinarily have a melting point above 127° C.

The type of wax, used in this invention, is a petroleum wax of the paraffin class, which is compatible with high density polyethylene. These paraffin waxes are composed primarily of straight chain molecules with a relatively small amount of branching, and have a molecular weight in the range of 300–1000. The melting point of the wax is in the range 47 to 65° C. preferably 55 to 65° C.

To obtain the objects of this invention aforementioned, the amount of wax that is crosslinked into the polyethylene-wax composition varies from 1.0 to 20% based on the overall weight of the composition. If greater amounts of wax are incorporated a decrease in the environmental stress cracking properties (ESC) is readily noticed.

The cross-linking agent preferably used in the present invention, is an organic peroxide. The organic peroxide employed should be one that produces free radicals at an effective rate within a temperature range of 80–200° C. Examples of such organic peroxides, include t-butyl perbenzoate, dicumyl peroxide, t-butyl perphthalate, and 2,7-dimethyl octane-2,7-ditertiary peroxide. The amount of peroxide used in carrying out this invention is a function of the melt index of the polyethylene used as a reactant. More specifically, the higher the melt index of the polyethylene, the greater the peroxide concentration necessary in order to obtain a processable cross-linked thermoplastic polyethylene-wax composition. Generally speaking, polyethylene having a melt index of 0.5 to 5.0 requires 0.05 to 1.0 percent peroxide based on the weight of the wax-polyethylene composition.

The following examples are set down to illustrate the invention and are not to be deemed as limiting its scope. The melt indices in all examples were measured under the conditions specified in ASTMD 1238–52T. Although the polyethylene used as a reactant in all examples had a melt index of 0.7 it should be understood that the melt index of the polyethylene reactant is not critical and polyethylene with a melt index in the range 0.5 to 5.0 is equally operable.

The density of the polyethylene used in all examples was 0.958 (as measured by the aforementioned density gradient tube method). (The melt indices of the resulting products in the examples were also measured in accordance with ASTMD 1238–52T.) The environmental stress-cracking data (ESC) was obtained in accord with ASTMD–1693T.

The clarity test devised specifically for evaluation of changes in the clarity of polyethylene due to crosslinking consists of viewing, through a ½" diameter hole centered in a horizontal sample table holding clarity test samples thereon, a glowing filament from a 2-watt concentrated arc lamp (point light source) the extreme tip of said filament being situated 3 inches below the bottom surface of said test sample. The test samples are prepared by molding under 10,000 lbs. pressure at 350° F. and then air cooled to room temperature. The results of the clarity test are expressed in terms of the clarity number (mils) which is defined as the maximum thickness of the sample in mils through which the glowing filament, as viewed from 1 foot above the sample table, can still be observed.

The percent gel content of the crosslinked wax-polyethylene products of the instant invention were measured by refluxing for 24 hours a weighed sample (approximately 0.5 g.) in a cellulose soxhlet thimble in xylene (containing 0.3 weight percent 2,6-ditertiary-butyl-4-methyl-phenol) commercially available under the trade name "Ionol" from Shell Oil Corp. The insoluble portion of the sample after drying was weighed to calculate percent gel as follows:

$$\text{Percent gel} = \frac{\text{weight insoluble sample}}{\text{total weight sample}} \times 100$$

For masticating the polyethylene compositions during the croslinking step, a Brabender Plastograph was used in all examples. However, other mechanisms, e.g., a Banbury mixer, are equally operable in performing this invention.

Unless otherwise noted all parts and percentages are by weight in the examples.

EXAMPLE 1

90.9 parts commercial polyethylene having a melt index of 0.7 and a density of 0.958 were charged to a Brabender Plastograph maintained at a temperature of 170° C. After the polyethylene was in a molten state, solid granules of a homogeneous mixture, preblended at 75° C. for 2 minutes with agitation, comprising 9 parts of a petroleum wax of the paraffin type having a melting point of 145° F. and a specific gravity of 0.925 at 60/60° F. as measured by the method described in ASTMD–70 and 0.1 part dicumyl peroxide were added to the molten polyethylene. Mastication in the Brabender Plastograph was continued for 15 minutes at 170° C. The crosslinked product, comprising 99.9 parts was collected and subjected to characterization. The crosslinked polyethylene-wax product had a melt index of 0.24, a density of 0.954, and endured 30 hours when subjected to the environmental stress-cracking test conducted at 50° C. referenced supra. Twenty parts of the crosslinked product were presed into a sheet 4" x 4" x 0.035" by means of hydraulic press (Pasadena Hydraulic, Inc. Model P–315). A comparison of the pressed sheet with a clarity control sheet comprising an equally dimensioned pressed sheet of polyethylene per se identical to that used as a reactant showed that the crosslinked product had a clarity number in the range 112–119 mils as compared to a clarity number of 10 mils for the polyethylene per se.

EXAMPLE 2

To ascertain the percent wax crosslinked with the polyethylene in Example 1, 5 parts of the product obtained therein were extracted in an extraction thimble with 216 parts of toluene containing 5 parts 2,6-ditertiary-butyl-1,4-methyl phenol for 15 hours. As a control, another extraction was performed under the same conditions with 5 parts polyethylene identical to that charged as a reactant in Example 1. The extraction solutions were cooled to room temperature leaving a soluble portion consisting of low molecular weight polyethylene in the control and low molecular weight polyethylene plus wax that was not crosslinked with polyethylene in Example 1. The control extraction had a percent soluble portion of 3% whereas the product from Example 1 was 10.5% soluble indicating that 13.75% of the wax reactant in Example 1 was crosslinked into the product.

EXAMPLE 3

Following the procedure of Example 1, excepting that 0.36 part t-butyl perbenzoate was substituted for the dicumyl peroxide, yielded a crosslinked product having a melt index of 0.51, and clarity superior to both the polyethylene clarity control sheet and the crosslinked product of Example 1.

EXAMPLE 4

Following the procedure of Example 1, except that 2,7-dimethyl octane-2,7-ditertiary butyl peroxide was substituted for the dicumyl peroxide, yielded a crosslinked polyethylene-wax product exhibiting improved clarity as compared to the polyethylene clarity control sheet.

EXAMPLE 5

The procedure of Example 1 was followed except that the masticating temperature in the Brabender Plastograph was 178° C. The crosslinked wax-polyethylene product had an environmental stress-cracking endurance of 30 hours, a melt index of 0.45 and a clarity number of 58–86 mils.

EXAMPLE 6

Following the procedure of Example 1, except that only 4.8 parts of a paraffin wax having a melting point of 145° F. was preblended with 0.1 part dicumyl peroxide prior to mastication with 95.1 parts commercial polyethylene (0.958 density) at a temperature of 186° C. produced a crosslinked wax-polyethylene product having a melt index of 0.27 and a density of 0.950. A comparison of a sample sheet of the crosslinked product with the polyethylene clarity control sheet showed the crosslinked wax-polyethylene product having greater clarity.

EXAMPLE 7

91 parts commercial polyethylene having a melt index of 0.7 and 9 parts of a paraffin wax having a melting point of 145° F. were masticated in a Brabender Plastograph at 170° C. for 15 minutes. On characterization the blended polyethylene-wax product had an environmental stress-cracking endurance of less than 23 hours and poor clarity. A comparison of the product of this example with the product of Example 1 shows the improved environmental stress-cracking properties and clarity obtained when the polyethylene and wax are crosslinked in the presence of a crosslinking agent as compared to a mere blending operation.

In order to show relative properties of various compositions Table I was compiled.

Table I
PROPERTIES OF POLYETHYLENE COMPOSITIONS [1]

| Example No. | Perox. type | Percent Perox. | Percent Wax | Mastication Time (min.) | Mastication Temp., °C. | Melt Index | ESC (hrs.) | Clarity No. (mils) |
|---|---|---|---|---|---|---|---|---|
| 8 | | | | 15 | 192 | 0.6 | 24 | 43–50 |
| 9 | | | 10.6 | 15 | 185 | 0.9 | 24 | 40–45 |
| 10 [2] | Dicumyl | 0.10 | 9.0 | 15 | 170 | 0.24 | 30 | 112–119 |

[1] Balance in all compositions is commercial polyethylene having a density of 0.958 and a melt index of 0.7.
[2] Dicumyl peroxide and wax preblended before addition to molten polyethylene.

As can be seen from the results in Table I, the only composition when compared to high density polyethylene per se (Example 9) having improved clarity and resistance to environmental stress cracking coupled with processability is the crosslinked wax-polyethylene product (Example 10).

To show the improved properties of the crosslinked wax-polyethylene product obtained by the process of the instant invention a comparative study was made with a crosslinked wax-polyethylene product produced by irradiation wherein the cross-linking is random.

EXAMPLE 11

90 parts of commercial polyethylene having a melt index of 0.7 and a density of 0.958 were charged to a Brabender Plastograph along with 10 parts of a petroleum wax of the paraffin type having a melting point of 145° F. and a specific gravity of 0.925 at 60/60° F. as measured in accord with the method described in ASTMD–70. The wax-polyethylene blend was milled for 15 minutes at 170° C.

The blend was removed from the Brabender and pressed into sheet (approx. 10 mils thick) in a Pasadena hydraulic press at 1000 p.s.i. at 350° F. for 3 minutes. The thus sheeted blend was cut into strips and subjected to varying megarad dosages of high energy irradiation from a Van de Graaff electron accelerator at room temperature in a nitrogen atmosphere. The dosage was administered at a rate of 1 megarad/pass with a 3 minute interval between passes. The thus irradiated wax-polyethylene strips were transferred under nitrogen to a Pasadena hydraulic press wherein the strips were repressed at 365° F. and 1000 p.s.i. for 15 minutes. The thus pressed strips were then characterized for gel content and clarity number. The results are given in Table II.

Table II

| Example No. | Irradiation Dosage (megarads) | Percent Gel Content | Clarity Number (mils) |
|---|---|---|---|
| 12a | 0 | 0 | 15–18 |
| 12b | 2 | 0 | 32–33 |
| 12c | 4 | 0 | 51–53 |
| 12d | 6 | 12.0 | 53–55 |
| 12e | 8 | 24.9 | 49–51 |
| 12f | 10 | 41.9 | 49–51 |

The examples in Table II in comparison with Example 10 show that with a random distribution of crosslinks between the wax and the polyethylene even at post gelation dosages the high clarity obtained by preblending is not obtained. This is due to the fact that insufficient wax is crosslinked with the polyethylene in a random crosslinking system as compared with applicant's preblending process.

In the following table (Table III) the effect of variation in the order of addition of the crosslinking agent and the wax is shown.

Table III
EFFECT OF VARIATION OF ORDER OF ADDITION OF WAX AND PEROXIDE TO POLYETHYLENE [1]

| Example No. | 1st Component added | 2nd Component added | Mastication time (min.) | Mastication Temp., °C. | Melt Index | ESC (hrs.) |
|---|---|---|---|---|---|---|
| 12 | Preblend | | 10 | 158 | 0.63 | 46 |
| 13 | Wax | Peroxide | 10 | 157 | 0.63 | 46 |
| 14 | Peroxide | Wax | 10 | 158 | 0.36 | 22 |
| 15 | Preblend | | 10 | 178 | 0.47 | 30 |
| 16 | Wax | Peroxide | 10 | 178 | 0.11 | 31 |
| 17 | Peroxide | Wax | 10 | 180 | 0.15 | (²) |

[1] In all above mixtures 9% paraffin wax (melting point 145° F.) and 0.1% dicumyl peroxide based on commercial polyethylene (density 0.058) was used. The balance is commercial polyethylene having a density of 0.958.
[2] Failure on bending.

In comparing Examples 12 and 13 in Table III it is to be noted that preblending of the wax and peroxide (Example 12) did not yield a more processable product (as shown by melt index) or have greater resistance to environmental stress cracking than Example 13 wherein the wax and peroxide were added sequentially in that order. This is due to the fact that at the masticating temperature, i.e., 158° C., the half-life of the peroxide was of such duration (about 4 minutes) as to nullify the effect of preblending and allowed the wax to blend throughout the polyethylene before the peroxide decomposed as in Example 13. However in Examples 15 and 16 performed at temperatures whereat the half-life of the peroxide is less than 1 minute it is noted that preblending is effective (Example 15) as sufficient wax is crosslinked into the product to increase processability over the sequential addition in Example 16. As a general rule, the more unstable the peroxide at any given mastication temperature, the greater the effect of preblending the wax and peroxide has on improving processability.

The crosslinked polyethylene-wax composition produced by the instant invention can be used in many applications wherein high density polyethylene was used heretofore. The composition of the present invention is especially useful in extrusion operations such as wire coating and piping in which improved environmental stress-cracking is desired and in the manufacture of containers wherein improved environmental stress cracking and clarity are required.

It should be understood that other additives may be incorporated into the polymer-wax composition provided they do not inhibit or destroy the crosslinking action of the peroxides. Such additives include fillers, pigments, dyes, antistatic agents, heat and light stabilizers, plasticizers and elastomers.

In the instant invention the wax-peroxide weight ratio varies in the range 1.0 to 400:1.0 respectively and depends on the amount of wax to be crosslinked with the polyethylene and the melt index of the polyethylene. In any event the amount of peroxide added to the polyethylene-wax composition does not exceed 1.0% by weight. Amounts in excess of 1.0% produce a thermoset composition which precludes processability.

The temperature of the crosslinking step must be high enough to maintain the polyethylene in a molten condition and also insure that the half-life of the peroxide is not greater than 1 minute. Thus for high density polyethylene having a melting point in the range 127–139° C. and dicumyl peroxide which has a half-life of 1 minute at 170° C. a temperature in the range 170–225° C. is employed.

Temperatures above 250° C. are preferably avoided especially for extended periods, due to thermal degradation of the polyethylene.

I claim:
1. A crosslinked thermoplastic wax-polyethylene composition consisting essentially of 99.0 to 80% by weight polyethylene having a density in the range 0.95 to 0.97 and 1.0 to 20% by weight of a parffin wax having a melting point in the range 47 to 65° C.

2. A process for producing a crosslinked thermoplastic wax-polyethylene composition which comprises preblending a paraffin wax having a melting point in the range 47 to 65° C. and an organic peroxide in a weight ratio of 1.0 to 400:1.0 respectively to form a homogeneous mass, said preblending being performed at a temperature above the melting point of the wax and below the decomposition temperature of the peroxide, and thereafter admixing said preblended homogeneous mass with molten polyethylene having a density in the range 0.950–0.970 at a temperature whereat the peroxide has a half-life of not more than 1 minute to form a crosslinked wax-polyethylene composition having a wax:polyethylene weight ratio in the range 1–20:99–80 respectively.

3. A composition consisting essentially of polyethylene having a density in the range 0.950 to 0.970, a minor amount, between about 1.0 and 20% by weight of said composition of a paraffin wax having a melting point in the range 47 to 65° C. and between 0.05 to 1.0% by weight of said composition of a peroxide selected from the group consisting of t-butyl perbenzoate, dicumyl peroxide, t-butyl perphthalate and 2,7-dimethyl octane-2,7-ditertiary butyl peroxide.

4. A composition consisting of polyethylene having a density in the range 0.950 to 0.970, a minor amount, between 1.0 and 20% by weight of said composition of a paraffin wax having a melting point in the range 47 to 65° C. and between 0.05 to 1.0% by weight of said composition of a peroxide selected from the group consisting of t-butyl perbenzoate, dicumyl peroxide, t-butyl perphthalate and 2,7-dimethyl octane-2,7-ditertiary butyl peroxide.

References Cited by the Examiner
UNITED STATES PATENTS 2,504,270   4/50   MacLaren et al. _____ 260—28.5
2,706,719   4/55   Newberg et al. _____ 260—94.9
3,030,322   4/62   Schrader _____ 260—28

MORRIS LIEBMAN, *Primary Examiner.*